US009635803B2

(12) United States Patent
Gray et al.

(10) Patent No.: US 9,635,803 B2
(45) Date of Patent: May 2, 2017

(54) METERING APPARATUSES FOR SECTIONAL CONTROL

(71) Applicant: Salford Group Inc., Salford (CA)

(72) Inventors: Geof J. Gray, Burford (CA); Mikhail Rodionov, North York (CA); John Mark Averink, Norwich (CA); Johan Braun Friessen, Tillsonburg (CA); Jesse Abram Dyck, London (CA)

( * ) Notice: Subject to any disclaimer, the term of this patent is extended or adjusted under 35 U.S.C. 154(b) by 57 days.

(21) Appl. No.: 14/668,445

(22) Filed: Mar. 25, 2015

(65) Prior Publication Data

US 2015/0271988 A1 Oct. 1, 2015

Related U.S. Application Data

(60) Provisional application No. 61/972,494, filed on Mar. 31, 2014.

(51) Int. Cl.
*A01C 7/20* (2006.01)
*A01C 7/08* (2006.01)
*A01C 7/12* (2006.01)

(52) U.S. Cl.
CPC ................ *A01C 7/088* (2013.01); *A01C 7/12* (2013.01); *A01C 7/123* (2013.01); *A01C 7/126* (2013.01); *A01C 7/127* (2013.01)

(58) Field of Classification Search
CPC ............ A01C 7/04; A01C 7/102; A01C 7/126
USPC ........................... 111/175-179; 222/162-166
See application file for complete search history.

(56) References Cited

U.S. PATENT DOCUMENTS

| | | | |
|---|---|---|---|
| 3,303,974 | A | 2/1967 | Bleuler |
| 4,342,336 | A | 8/1982 | Satterthwaite et al. |
| 4,758,119 | A | 7/1988 | Frase et al. |
| 5,325,800 | A | 7/1994 | Wisor et al. |
| 7,255,050 | B2 | 8/2007 | Johannaber et al. |
| 7,743,719 | B2 | 6/2010 | Memory |
| 8,001,915 | B2 | 8/2011 | Friggstad |

(Continued)

FOREIGN PATENT DOCUMENTS

| | | |
|---|---|---|
| CA | 2648452 | 12/2009 |
| CA | 2704887 | 12/2010 |

(Continued)

OTHER PUBLICATIONS

The Lump Buster. Product photograph of the Lump Buster manufactured by Rainy Day Fabricating.

*Primary Examiner* — John G Weiss

(57) ABSTRACT

A metering apparatus for distributing an agricultural product in a field has a meterbox configured for association with a hopper for receiving agricultural product from the hopper. A rotatable metering element is disposed within a chamber in the meterbox, and the rotating metering element is configured to deliver the agricultural product at a regulated rate from the hopper through the chamber to a product distribution line. Delivery of the agricultural product to the product distribution line may be selectively stopped by a reversibly inflatable seal between the metering element and an outlet to the distribution line, a reversible seal formed by contact between the metering element and an inlet from the hopper to the chamber, or a disengagement structure for disengaging the agricultural product from the metering element while the metering element continues to rotate.

15 Claims, 12 Drawing Sheets

(56) References Cited

U.S. PATENT DOCUMENTS

| | | | | |
|---|---|---|---|---|
| 8,132,521 | B2 | 3/2012 | Snipes et al. | |
| 8,141,504 | B2 * | 3/2012 | Dean | A01C 7/081 111/179 |
| 8,281,724 | B2 * | 10/2012 | Snipes | A01C 7/102 111/178 |
| 8,342,373 | B2 | 1/2013 | Memory | |
| 8,371,238 | B2 | 2/2013 | Dean et al. | |
| 8,434,416 | B2 | 5/2013 | Kowalchuk et al. | |
| 8,517,230 | B2 | 8/2013 | Memory | |
| 8,522,700 | B2 | 9/2013 | Landphair | |
| 8,601,962 | B2 | 12/2013 | Kowalchuk et al. | |
| 8,733,259 | B2 * | 5/2014 | Beaujot | A01C 7/126 111/178 |
| 2009/0314191 | A1 | 12/2009 | Friggstad | |
| 2012/0132115 | A1 | 5/2012 | Dean et al. | |
| 2012/0174843 | A1 | 7/2012 | Friggstad | |
| 2012/0174844 | A1 | 7/2012 | Friggstad | |
| 2012/0227648 | A1 | 9/2012 | Kowalchuk et al. | |
| 2012/0227649 | A1 | 9/2012 | Kowalchuk et al. | |
| 2012/0227650 | A1 | 9/2012 | Kowalchuk et al. | |
| 2012/0301231 | A1 | 11/2012 | Jagow et al. | |
| 2013/0233216 | A1 | 9/2013 | Kowalchuk et al. | |
| 2014/0261117 | A1 * | 9/2014 | Gray | A01C 7/081 111/174 |

FOREIGN PATENT DOCUMENTS

| | | | |
|---|---|---|---|
| CA | 2716678 | 4/2011 | |
| CA | 2748706 | 7/2012 | |
| CA | 2754506 | 9/2012 | |
| DE | 3827220 A1 * | 3/1989 | A01C 7/126 |
| RU | 2228586 | 5/2004 | |

* cited by examiner

METERING APPARATUSES FOR SECTIONAL CONTROL

CROSS-REFERENCE TO RELATED APPLICATIONS

This application claims the benefit of U.S. Provisional Patent Application Ser. No. 61/972,494 filed Mar. 31, 2014, the entire contents of which is herein incorporated by reference.

FIELD OF THE INVENTION

This invention relates to metering apparatuses for agricultural product.

BACKGROUND OF THE INVENTION

Implements for distributing agricultural product (e.g. seed, fertilizer, etc.) in a field are generally towed behind a tractor or other vehicle. Such implements include one or more ground engaging tools for opening the ground to provide a path in which the agricultural product is deposited. Deposition is accomplished by a system for distributing the agricultural product generally from a single large bin through various lines and ports to be finally deposited on the ground through an outlet port. Following the deposition of the agricultural product, packers cover the deposited agricultural product with soil.

An air cart is one system for distributing agricultural product. An air cart comprises one or more large bins for holding one or more different types of agricultural product, an airflow source (e.g. a fan) and lines or hoses through which agricultural product is carried by the airflow to outlets located at or near the ground engaging tools of the implement. The product passes through the outlet to be deposited on the ground. There are typically a plurality of lines, hoses and ports, one outlet port associated with each ground engaging tool in order to apply product in a regular pattern to large areas of land in a single pass of the implement.

In air carts, proper metering of agricultural product into the airflow is desired to regularize the amount of product delivered to the outlets over time in order to reduce over- or under-deposition of the product in a particular area. Air carts traditionally employed single auger hoppers in which one very large (1-2 feet long) rotating auger distributed agricultural product from the hopper into a single airstream. Such arrangements are still used today by some manufacturers, for example Amity. Single auger air carts suffer from a number of problems. First, either the auger is on or off so agricultural product is either delivered across the entire implement or not delivered at all anywhere on the implement. Thus, fine control over sectional metering is impossible. Second, agricultural product must be metered into an initial large 5" line, and then split into 2.5" lines followed by another split into 1" lines. This creates more complexity as secondary splitters are required and provides less control in how product is transported around the distribution system. Third, it is impossible to distribute more than one kind of product at the same time.

Fine sectional control is desirable because passage of the implement over soil that has already received agricultural product (e.g. the headland) would result in waste of product; therefore, it is desirable to shout off distribution to parts of the implement that are passing over such soil. In an effort to solve this problem, metering apparatuses are preferably equipped with sectional shutoff capabilities to selectively stop deposition of product at parts of the implement passing over already serviced soil. Metering apparatuses for this purpose are known in the art, for example as disclosed in US 2012/0325131 published Dec. 27, 2012, U.S. Pat. No. 8,132,521 issued Mar. 13, 2012, U.S. Pat. No. 8,141,504 issued Mar. 27, 2012 and U.S. Pat. No. 8,196,534 issued Jun. 12, 2012, the entire contents of all of which are herein incorporated by reference. Such metering apparatuses generally involve a meter roller assembly in which a plurality of meter rollers is rotated on a common shaft, the rollers rotating around a transverse axis relative to the motion of the distribution implement. In such an arrangement, sectional control of the meter rollers to prevent distribution of product to certain parts of the implement is problematic. Complicated clutching mechanisms or inefficient gating mechanisms have all been used as described in the aforementioned prior art apparatuses.

Recent developments have provided metering apparatuses for distributing an agricultural product having a plurality of metering elements coupled to a drive input, each of the metering elements rotating around different axes of rotation. Examples are described in commonly owned U.S. Ser. No. 14/198,584 filed Mar. 5, 2014 and in U.S. Pat. No. 8,434,416 issued May 7, 2013, the entire contents of both of which are herein incorporated by reference. Sectional control may be accomplished by shutting off flow of agricultural product at individual metering elements through the use of clutches or individually driven metering elements.

However, there remains a need for metering apparatuses for agricultural product having different means for sectional control of product distribution in a field.

SUMMARY OF THE INVENTION

There is provided a metering apparatus for distributing an agricultural product, comprising: a meterbox configured for association with a hopper for receiving agricultural product from the hopper; a rotatable metering element disposed within a chamber in the meterbox, the rotating metering element configured to deliver the agricultural product at a regulated rate from the hopper through the chamber to a product distribution line; and, stopping means for selectively stopping delivery of the agricultural product to the product distribution line, the stopping means comprising a reversibly inflatable seal between the metering element and an outlet to the distribution line, a reversible seal formed by contact between the metering element and an inlet from the hopper to the chamber, or a disengagement structure for disengaging the agricultural product from the metering element while the metering element continues to rotate.

There is further provided an agricultural product distribution system comprising a metering apparatus of the present invention.

The metering apparatus and distribution system have a longitudinal axis in the direction of forward (or backward) motion of an agricultural product distribution implement as it is being towed across the ground. The longitudinal axis runs from front to rear (or rear to front) of the metering apparatus and distribution system. The metering apparatus and distribution system have a transverse axis that is perpendicular to the longitudinal axis and runs side to side (left to right or right to left) of the metering apparatus and distribution system.

The metering apparatus comprises a rotatable metering element disposed within a chamber in the meterbox. Rotatable metering element may include, for example, belt meters, meter rollers and the like. Meter rollers may include smooth output rollers, pegged output rollers, fluted output rollers, high output rollers, etc.

There may be one or a plurality of the metering elements in the chamber arranged in one or a plurality of rows. The metering elements may be driven on a common shaft, or one or more of the metering elements may be driven on one or more separate shafts. In one embodiment, all of the metering elements may be driven on a single shaft. The number of metering elements per meterbox is preferably three or more, four or more or five or more. One or more, two or more or three or more rows of metering elements may be used. The numbers will depend to an extent on the size of the distribution implement. From 1 to 5 rows and from 5 to 15 metering elements per row are preferred. For many applications, 1 row with from 6 to 12 metering elements in one meterbox is suitable.

One or more drive inputs may be used to drive rotation of the metering elements. The drive input may be derived from any suitable source of mechanical power, for example a motor or motors. Motors include electric motors, hydraulic motors, stepper motors, internal combustion engines, etc. In some cases the power take-off from a towing vehicle may be used to drive the metering elements. In other cases, a ground driven wheel may be used to provide rotational movement of the drive input by virtue of forward travel of the implement along the field. The drive input may be coupled to the metering elements by any coupling means suitable for the type of drive input and the arrangement of the metering elements on drive shafts. Couplings include, for example, belt on pulley, chain on sprocket, directly linked drive shaft, etc.

The metering elements may be disposed in the meterbox collectively in a single chamber, individually within individual chambers or some combination thereof. The chamber may comprise one or more openable and closeable access ports for permitting access into the chamber without removing any metering element. Access permits servicing the metering apparatus without necessarily needing to take the time to remove the metering elements. In some embodiments, the access ports may also permit individual servicing of each metering element, for example individual cleaning or, if needed or desired, individual change out of a metering element without needing to disturb the other metering elements.

The meterbox may further comprise an inlet for receiving agricultural product from the hopper and an outlet for delivering metered product to a product distribution line, for example an air distribution line in the case of air carts. There may be a plurality of inlets and/or outlets. Each metering element may be associated with one inlet, or one inlet may provide product to more than one metering element. Each metering element may be associated with one outlet, one metering element may be associated with more than one outlet, one outlet may be associated with more than one metering element of some combination thereof. The meterbox may be separated from or integrated within the hopper. The hopper and/or meterbox may be equipped with other standard features, for example, covers, canopies and/or agitator bars.

The stopping means permits selective delivery of the agricultural product to the product distribution line. Being able to select whether the product distribution line will receive product at any given time permits sectional control of product delivery to the field. It is desirable to avoid multiple applications of agricultural product to the same area of the field, both for reducing product waste and also for improving product performance by providing it at the correct dosage. Furthermore, where the metering apparatus comprises a plurality of metering elements, it is possible to configure the stopping means to prevent delivery of product from one or more metering elements but not others. This permits an operator to sequentially or otherwise selectively prevent product delivery from individual or groups of metering elements when approaching an irregular boundary, such as a water hole, in a field while towing the distribution implement. Because the implement must be towed to avoid the irregular boundary, parts of the implement will be towed over areas of the field in which agricultural product has already been deposited. By selectively determining the rate of application of agricultural product across a width of the distribution implement, the present invention permits control over where the agricultural product will be deposited, thus greatly reducing product waste and improving distribution patterns of the product in the field.

The stopping means may comprise a reversibly inflatable seal between the metering element and an outlet to the distribution line. The reversibly inflatable seal may comprise a surface that engages an inner surface of the chamber when the inflatable seal is inflated to block passage of the agricultural product from the chamber to the outlet. The surface of the inflatable seal may comprise a protrusion, and the protrusion may abut a floor of the chamber proximate the outlet when the inflatable seal is inflated. The inflatable seal may comprise a base secured to a wall of the chamber. When there is a plurality of metering elements, there may be a single inflatable seal for all the metering elements, one inflatable seal for each metering element or one inflatable seal for a few of the metering elements and other inflatable seals for the other metering elements. For individual control over product flow from individual metering element, one inflatable seal per metering element is preferred. Furthermore, the metering apparatus may comprise one or more conduits for recycling agricultural product from the chamber to the hopper when the inflatable seal is inflated.

The stopping means may comprise a reversible seal formed by contact between the metering element and an inlet from the hopper to the chamber. The seal may be formed and unformed by moving the metering element between a lowered unsealing position and a raised sealing position. The movement may involve a simple translation of the metering element up and down, or may involve a pivoting motion of the metering element. In one embodiment, the metering element comprises a meter roller. The meter roller may comprise an arcuate surface that protrudes into the hopper through the inlet when the meter roller is in the raised sealing position, whereby the arcuate surface abuts the hopper on each side of the inlet to seal the inlet to prevent flow of agricultural product from the hopper to the chamber. The meter roller may be pivotable between the raised sealing position and the lowered unsealing position to open and close a gap between the arcuate surface and the hopper at only one side of the inlet. The gap has a size that may be adjusted to vary the rate at which the agricultural product is delivered to the product distribution line. In another embodiment, the metering element comprises a belt meter. The belt meter may comprise an endless belt having an outer surface that abuts the hopper on each side of the inlet when the belt meter is in the raised sealing position to seal the inlet and prevent flow of agricultural product from the hopper to the chamber. The belt meter may be pivotable between the raised sealing position and the lowered unsealing position to open and close a gap between the endless belt and the hopper at one side of the inlet and to downwardly incline the belt meter toward the one side of the inlet when the belt meter is in the lowered unsealing position. The gap has a size that may be adjusted to vary the rate at which the agricultural product is delivered to the product distribution line.

The stopping means may comprise a disengagement structure for disengaging the agricultural product from the metering element while the metering element continues to rotate. The disengagement structure permits disengagement of the agricultural product from the metering element while the metering element continues to rotate; however, in addition to using the disengagement structure, the metering element may also be stopped, if desired, to further ensure that metering of the agricultural product is stopped.

In one embodiment, the disengagement structure may comprise moving the agricultural product away from the metering element. Moving the agricultural product may involve lowering, raising and/or laterally translating a structure that contains the agricultural product. For example, the chamber may comprise a chamber floor and the disengagement structure may comprise the chamber floor movable between a product engaging position and a product disengaging position. Preferably, the product engaging position comprises a raised position and the product disengaging position comprises a lowered position. One of a variety of arrangements may be utilized to facilitate moving the chamber floor. In one arrangement, the chamber may comprise a trough portion secured by a hinge to the hopper or an immovable part of the meterbox, whereby the trough portion may comprise the chamber floor and the trough portion may swing on the hinge between a raised and lowered positions. The meterbox may comprise an inclined portion having a lip over which the agricultural product flows to reach an outlet to the product distribution line, and an inlet guard depending down from the hopper into the chamber such that an end of the inlet guard is at a level low enough to prevent continuous agricultural product flow over the lip. In one embodiment, the inlet guard is at the same level as or lower than the lip. The chamber floor may comprise an inclined portion that slidably abuts the inclined portion of the meterbox to form a seal to prevent agricultural product from exiting the chamber without flowing over the lip. In another arrangement, the chamber may comprise a trough portion secured to a translatable product conduit. The product conduit may be configured to permit agricultural product to flow from the hopper to the trough portion. An actuator, for example a hydraulic cylinder, an electrical actuator, a spring or a combination thereof, may be utilized to effect translation of the product conduit and trough portion. In one embodiment, a hydraulic actuator may be utilized to selectively translate the product conduit and trough portion, while a compression spring may be utilized at the same time to continuously bias the product conduit and trough portion toward the product engaging position. The conduit may be translated in any direction, for example vertically, laterally or at an angle to the lateral and/or vertical directions. Preferably, the conduit is translated vertically, or at an angle of up to 45° to the vertical and horizontal directions.

In another embodiment, the metering element may comprise a meter roller and the disengagement structure may comprise the meter roller movable between a lowered product engaging position and a raised product disengaging position. The chamber may comprise a chamber floor comprising an inclined portion having a lip over which the agricultural product flows to reach an outlet to the product distribution line, and an inlet guard depending down from the hopper into the chamber such that an end of the inlet guard is at a level low enough to prevent continuous agricultural product flow over the lip. In one embodiment, the inlet guard is at the same level as or lower than the lip. Raising and lowering of the meter roller may involve a simple translation of the meter roller up and down, or may involve a pivoting motion of the meter roller. The meter roller may be pivoted between the raised and lowered positions in any suitable fashion, for example by an actuator (e.g. a linear actuator or a hydraulic cylinder). The meter roller may be connected to a gear and the gear intermeshed with a driven sprocket. Driving the sprocket drives the meter roller. Where more than one meter roller is present, one or more drive axles may be used to drive the sprockets and hence the meter rollers.

Agricultural product may include, for example, seed, fertilizer, pesticide, etc. Different types of agricultural product may be distributed separately or at the same time. It is a particular advantage that one implement can have multiple hoppers, each hopper containing different agricultural product and equipped with metering elements arranged in accordance with the present invention for simultaneous distribution of different agricultural product while having separate sectional control over the distribution of each type of agricultural product.

The metering apparatus may be used in conjunction with an agricultural product distribution system, for example an air cart where airflow is used to transport agricultural product through various air lines (e.g. hoses) and ports to outlet ports through which the product is deposited in soil. In such an air cart arrangement, the metering apparatus meters agricultural product into an airstream that carries the product to other parts of the distribution implement. Each airstream is generally carried in separate air lines. There may be one or more than one metering element per airstream, so a single airstream may receive product from one or more than one metering element.

Further features of the invention will be described or will become apparent in the course of the following detailed description. It will be apparent that certain features while described in the context of one embodiment are also applicable in the context of any other embodiment, and that the detailed description is meant to illustrate particular embodiments and not limit the applicability of individual features only to the embodiments in which the features are described.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1A:
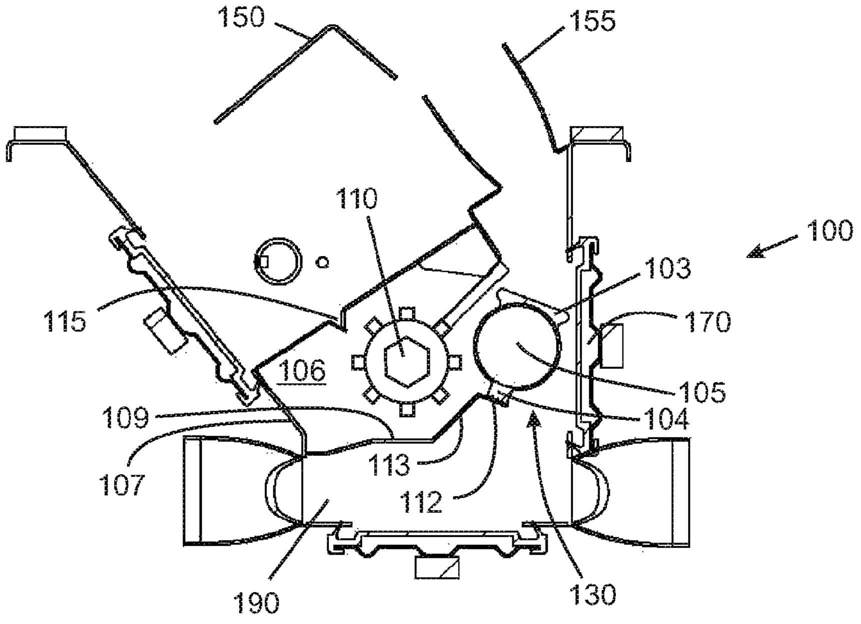
FIG. 1A depicts a first embodiment of a metering apparatus where flow of agricultural product to an air distribution line is blocked by an inflatable balloon between a meter roller and an outlet to the air distribution line.
Figure 1B:
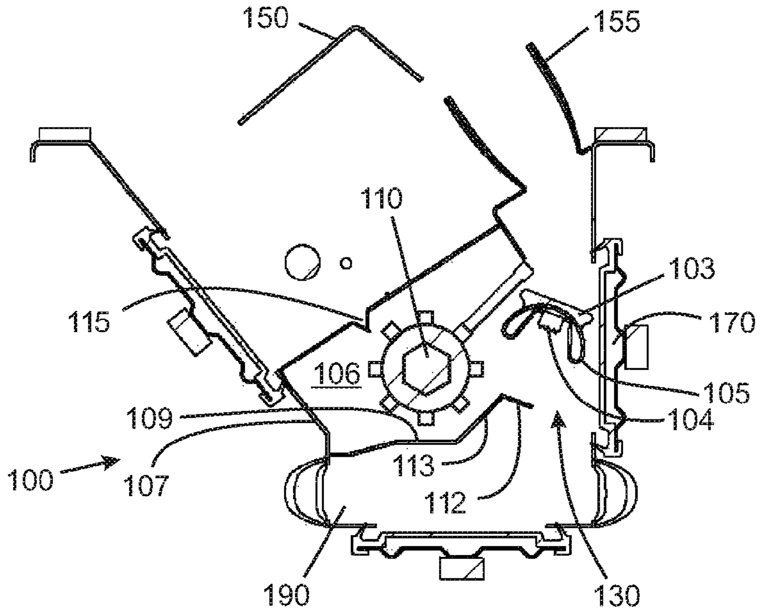
FIG. 1B depicts the metering apparatus of FIG. 1A where the inflatable balloon is deflated to permit flow of agricultural product to the air distribution line.

With reference to FIG. 1A and FIG. 1B, a metering apparatus 100 is shown in which flow of agricultural product from a hopper 150 to an air distribution line 190 may be blocked by an inflatable balloon 105 between a meter roller 110 and an outlet 130 to the air distribution line 190. The metering apparatus 100 comprises the meter roller 110, in this case a pegged meter roller although any suitable meter roller (e.g. a smooth roller, fluted roller or high output roller) may be employed, disposed within a metering chamber 106 of a meterbox 107. The metering chamber 106 is in communication with the hopper 150 via an inlet 115 so that the agricultural product in the hopper 150 can flow into the metering chamber 106. The agricultural product collects on a floor 109 of the metering chamber 106 and engages with the meter roller 110. As seen in FIG. 1B, when the balloon 105 is deflated, rotation of the meter roller 110, in this case clockwise rotation, meters the agricultural product at a regulated rate up and over a lip 112 proximate an end of an inclined portion 113 of the floor 109 to exit the metering chamber 106 through the outlet 130 into the air distribution line 190, which carries the agricultural product to product application outlets for distribution in a field.

When it becomes desirable to cut off flow of the agricultural product to the air distribution line 190, the balloon 105 may be inflated by directing air flow (or some other gaseous or liquid medium) into the balloon 105. Air for inflating the balloon may be provided by the same or different source as the air for the air distribution line. For example, an air compressor or other type of compressive device may be provided to inflate the balloon with any suitable gaseous or liquid medium. Decompression may be accomplished by letting the medium vent into the environment. The balloon naturally retracts and decompresses to its deflated state.

The balloon 105 comprises an external knob 104 that engages and seals against the lip 112 of the floor 109 of the metering chamber 106 when the balloon is inflated thereby sealing the outlet 130 away from the meter roller 110 so that the agricultural product cannot be metered through the outlet 130 even though the meter roller 110 continues to rotate. Deflating the balloon 105 disengages the knob 104 from the lip 112 to once again permit the agricultural product to flow over the lip 112 through the outlet 130 and into the air distribution line 190.

The balloon 105 is made from a sufficiently flexible material, for example an elastomer such as natural or synthetic rubber, to permit inflation and deflation of the balloon. The knob 104 may be made of the same or different material as the balloon 105. The knob 104 is preferably made of sufficiently flexible material to form a suitable seal with the lip 112. Both the balloon 105 and the knob 104 are preferably made of sufficient durable material to be able to resist the flow of agricultural product from a constantly rotating meter roller and to withstand repeated inflations and deflations.

The balloon 105 may be secured in the metering chamber 106 by attaching base 103 of the balloon to a wall of the metering chamber 106. When the balloon 105 is inflated as shown in FIG. 1A, agricultural product moved as a result of the meter roller 110 constantly rotating may travel up the side of the balloon 105. To prevent agricultural product from overtopping the balloon 105 and falling down the other side, a duct may be provided to recycle the agricultural product back to the hopper 150 from the metering chamber 106. Further, a pressure equalizing duct 155 is provided for venting out air from above the meter roller 110 when the air distribution fan is turned off. Furthermore, to be able to access the inside of the metering chamber 106 to effect maintenance, repair, cleaning or the like of the metering apparatus, a removable gate 170 may be included over an aperture in one of the walls of the metering chamber 106. Removing the removable gate 170 provides access to the inside of the metering chamber 106 through the aperture in the wall of the metering chamber 106.

With reference to FIG. 2A, FIG. 2B, FIG. 2C, FIG. 2D, FIG. 2E and FIG. 2F, a metering apparatus 200 is shown in which flow of agricultural product 220 from a hopper 250 to an air distribution line (not shown) may be blocked by a meter roller 210 protruding into the hopper 250 and forming a seal with the hopper 250 at an inlet 215 from the hopper 250 into a metering chamber 206. The metering apparatus 200 comprises the meter roller 210, in this case a smooth surfaced meter roller although any suitable meter roller (e.g. a pegged roller, fluted roller or high output roller) may be employed, disposed within the metering chamber 206 of a meterbox 207. The metering chamber 206 is in communication with the hopper 250 via the inlet 215 so that the agricultural product 220 in the hopper 250 can flow into the metering chamber 206 when the meter roller 210 does not block the inlet 215. The hopper 250 comprises first and second roller plates 251,252 having end surfaces 253,254, respectively, that are configured to abut or almost abut the arcuate outer surface 211 of the meter roller 210. The roller plates 251,252 are secured to an inside wall of the hopper 250 and flank the inlet 215, protruding partially into the inlet aperture 215. When the meter roller 210 is in a closed position a seen in FIG. 2A and FIG. 2B, the end surfaces 253,254 of the roller plates 251,252, respectively, are abutting or in close proximity to the arcuate surface 211 of the meter roller 210 so that there is insufficient space between the arcuate surface 211 and the end surfaces 253,254 to permit agricultural product 220 from entering the metering chamber 206 from the hopper 250. At the same time, the arcuate surface 211 may not actually touch the end surfaces 253,254 or may only touch slightly so that the meter roller 210 can continue to rotate or to accommodate surface features on the meter roller, e.g. pegs, in which case a brush may be disposed at the inlet to prevent product from flowing when the meter roller is in the closed position.

Figure 2A:
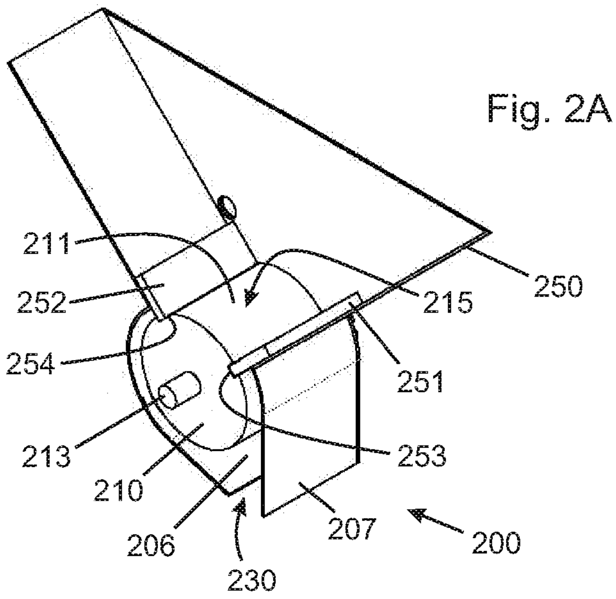
FIG. 2A depicts a perspective view of a second embodiment of a metering apparatus where flow of agricultural product to an air distribution line is blocked by a meter roller protruding into a hopper and forming a seal with the hopper at an inlet from the hopper into a metering chamber.
Figure 2B:
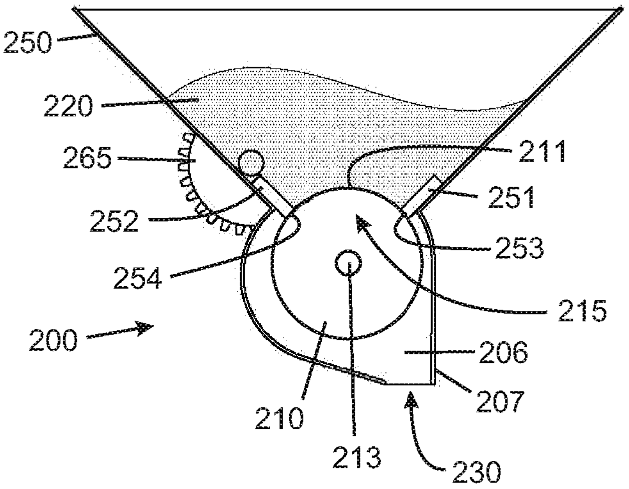
FIG. 2B depicts a side view of FIG. 2A.
Figure 2C:
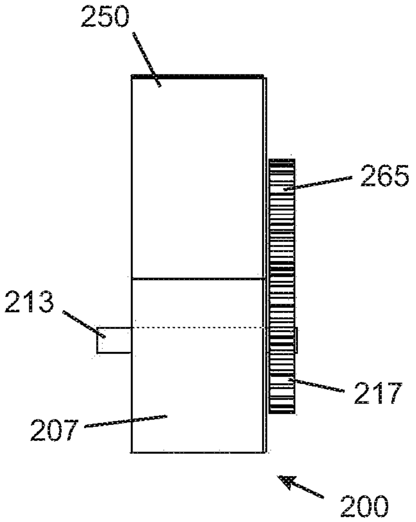
FIG. 2C depicts an end view of FIG. 2A.
Figure 2D:
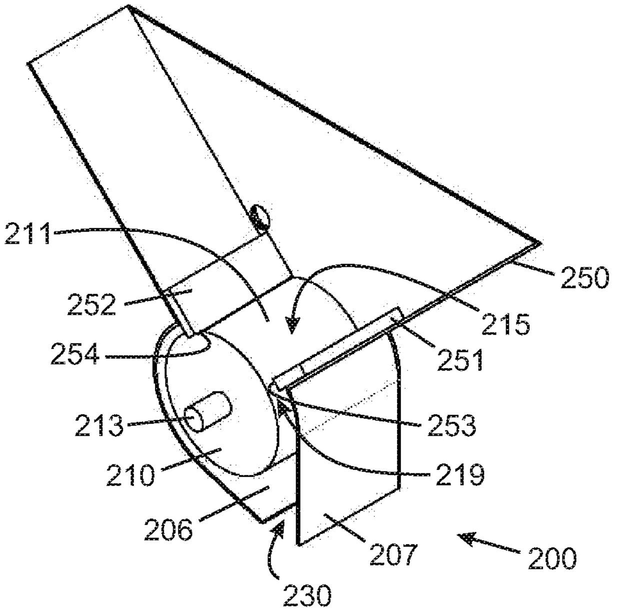
FIG. 2D depicts the metering apparatus of FIG. 2A where the meter roller has been pivoted away from the inlet to permit flow of agricultural product from the hopper to the metering chamber and then to the air distribution line.
Figure 2E:
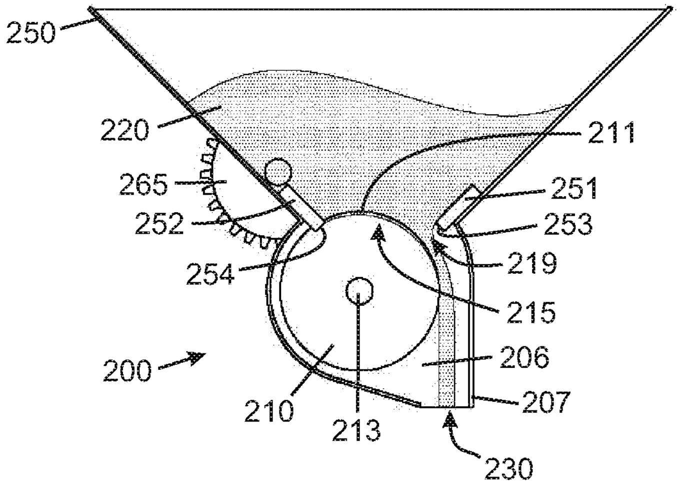
FIG. 2E depicts a side view of FIG. 2D.
Figure 2F:
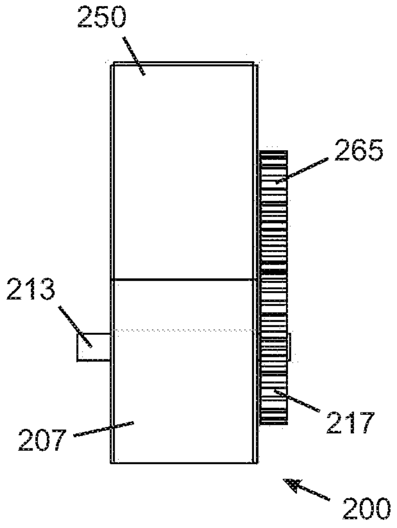
FIG. 2F depicts an end view of FIG. 2D.

To open the inlet as shown in FIG. 2D and FIG. 2E, the meter roller 210 may be pivoted downward by rotation of a driven sprocket 265 geared to a gear 217 on a roller shaft 213 on which the meter roller 210 is mounted. Pivoting of the meter roller 210 causes the arcuate surface 211 to move away from the end surface 253 of the first plate 251 thereby opening a gap 219 between the arcuate surface 211 of the meter roller 210 and the end surface 253 of the first plate 251. The gap 219 permits the agricultural product 220 from the hopper 250 to enter the metering chamber 206 and to be metered down at a regulated rate to outlet 230 at the bottom of the metering chamber 206 by the rotating meter roller 210, which in this case is rotating clockwise. Further, varying the width of the gap 219 provides an opportunity to change the rate of metered product, permitting changes for various sizes and rates of agricultural product in addition to being able to vary the speed of the meter roller 210. The outlet 230 is in communication with the air distribution line, which carries the agricultural product 220 to product application outlets for distribution in a field. The sprocket 265 and shaft 213 are configured so that pivoting of the meter roller 210 does not appreciably change the distance between the arcuate surface 211 and the end surface 254 of the second plate 252. Reversing the pivoting motion of the meter roller 210 causes the gap 219 to close between the arcuate surface 211 and the end surface 253 of the first plate 251 thereby preventing flow of the agricultural product 220 from the hopper 250 to the metering chamber 206.

With reference to FIG. 3A, FIG. 3B, FIG. 3C, FIG. 3D, FIG. 3E and FIG. 3F, a metering apparatus 300 is shown in which flow of agricultural product 320 from a hopper 350 to an air distribution line (not shown) may be blocked by an endless belt 311 of a belt meter 310 that may form a seal with the hopper 350 at an inlet 315 from the hopper 350 into a metering chamber 306. The metering apparatus 300 comprises the belt meter 310, in this case a smooth belt although any suitable belt (e.g. a pegged belt or fluted belt) may be employed, disposed within the metering chamber 306 of a meterbox 307. The metering chamber 306 is in communication with the hopper 350 via the inlet 315 so that the agricultural product 320 in the hopper 350 can flow into the metering chamber 306 when the endless belt 311 of the belt meter 310 does not block the inlet 315. The hopper 350 comprises first and second belt plates 351,352 having end surfaces 353,354, respectively, that are configured to abut or almost abut the outer surface of the endless belt 311 of the belt meter 310. The belt plates 351,352 are secured to an inside wall of the hopper 350 in the inlet 315 leaving a sufficiently sized aperture for the agricultural product 320 to flow through the inlet 315. When the belt meter 310 is in a closed position a seen in FIG. 3A and FIG. 3B, the end surfaces 353,354 of the belt plates 251,252, respectively, are abutting or in close proximity to the outer surface of the endless belt 311 of the belt meter 310 so that there is insufficient space between the outer surface of the endless belt 311 and the end surfaces 353,354 to permit agricultural product 320 from entering the metering chamber 306 from the hopper 350. At the same time, the outer surface of the endless belt 311 may not actually touch the end surfaces 353,354 or may only touch slightly so that the endless belt 311 can continue to rotate or to accommodate surface features on the endless belt, e.g. pegs, in which case a brush may be disposed at the inlet to prevent product from flowing when the belt meter is in the closed position.

The belt meter 310 comprises the endless belt 311 looped around driven pulley 323 and idler pulley 324. The driven pulley 323 is mounted on drive shaft 313 and the idler pulley 324 is mounted on idler shaft 314. The inside surface of the endless belt 311 and the outside surface of the pulleys 323,324 may comprise mated engagement elements 326,327 that engage each other to assist with preventing slippage of the endless belt 311 when the endless belt 311 is being driven. Slippage would be problematic for the regulated metering of agricultural product 320 by the belt meter 310. In alternate embodiments, the shaft 314 may be driven and the shaft 313 may be an idler or both shafts may be driven.

Figure 3A:
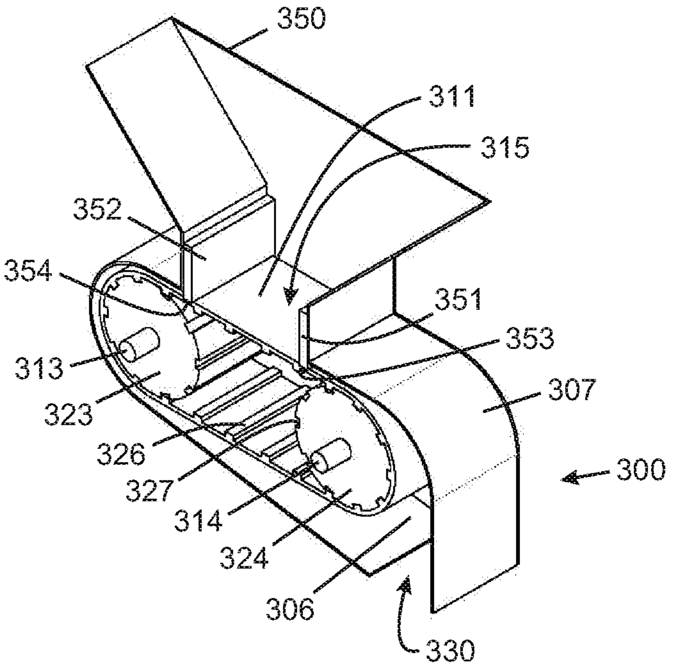
FIG. 3A depicts a perspective view of a third embodiment of a metering apparatus where flow of agricultural product to an air distribution line is blocked by a belt of a belt meter forming a seal with a hopper at an inlet from the hopper into a metering chamber.
Figure 3B:
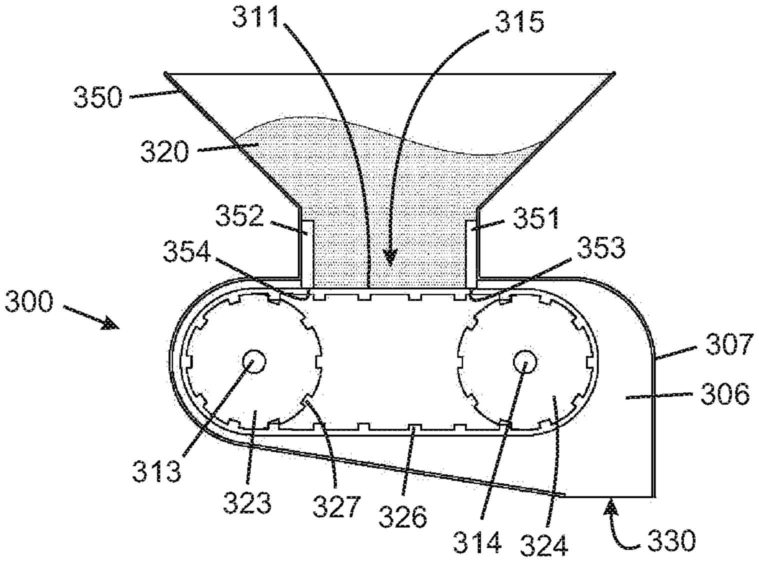
FIG. 3B depicts a side view of FIG. 3A.
Figure 3C:
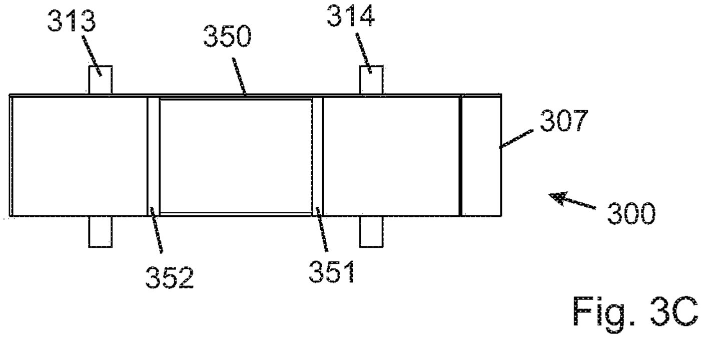
FIG. 3C depicts a top view of FIG. 3A.
Figure 3D:
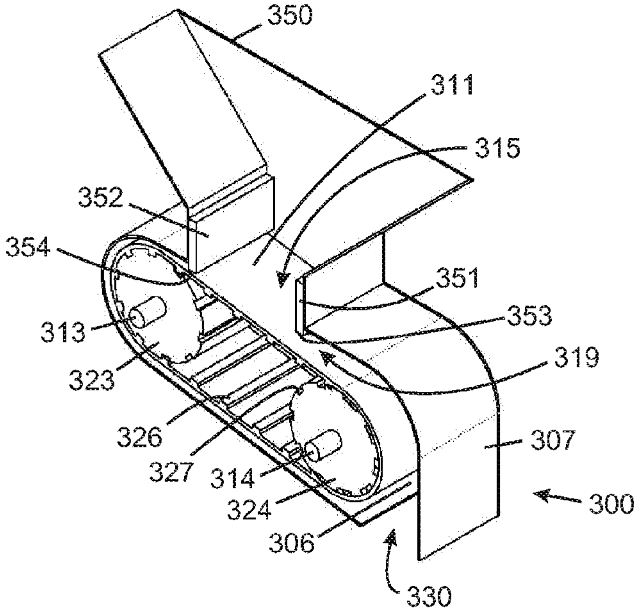
FIG. 3D depicts the metering apparatus of FIG. 3A where the belt meter has been pivoted away from the inlet to permit flow of agricultural product from the hopper to the metering chamber and then to the air distribution line.
Figure 3E:
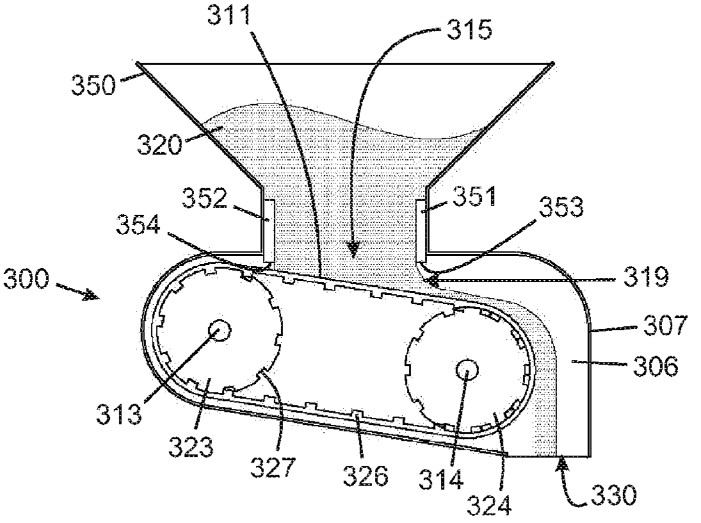
FIG. 3E depicts a side view of FIG. 3D.
Figure 3F:
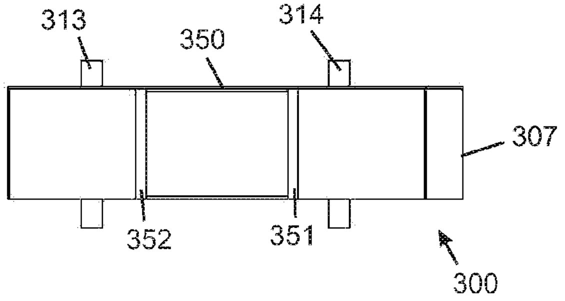
FIG. 3F depicts a top view of FIG. 3D.

To open the inlet as shown in FIG. 3D and FIG. 3E, the belt meter 310 may be pivoted downward about driven shaft 313. Pivoting of the belt meter 310 in this way causes the outside surface of the endless belt 311 to move away from the end surface 353 of the first plate 351 thereby opening a gap 319 between the outside surface of the endless belt 311 and the end surface 353 of the first plate 351. In addition, the belt meter 310 becomes downwardly inclined toward the side of the inlet 315 at which the gap 319 has opened. The gap 319 permits the agricultural product 320 from the hopper 350 to flow through the inlet 315 on to the endless belt 311, which in this case is rotating clockwise, to be metered at a regulated rate by the belt meter 310 through the metering chamber 306 down to outlet 330 at the bottom of the metering chamber 306. Further, varying the size of the gap 319 provides an opportunity to change the rate of metered product, permitting changes for various sizes and rates in addition to being able to vary the speed of the belt meter 310. The outlet 330 is in communication with the air distribution line, which carries the agricultural product 320 to product application outlets for distribution in a field. Reversing the pivoting motion of the belt meter 310 causes the gap to close between the outer surface of the endless belt 311 and the end surface 353 of the first plate 351 thereby preventing flow of the agricultural product 320 from the hopper 350 to the metering chamber 306.

Figure 4A:
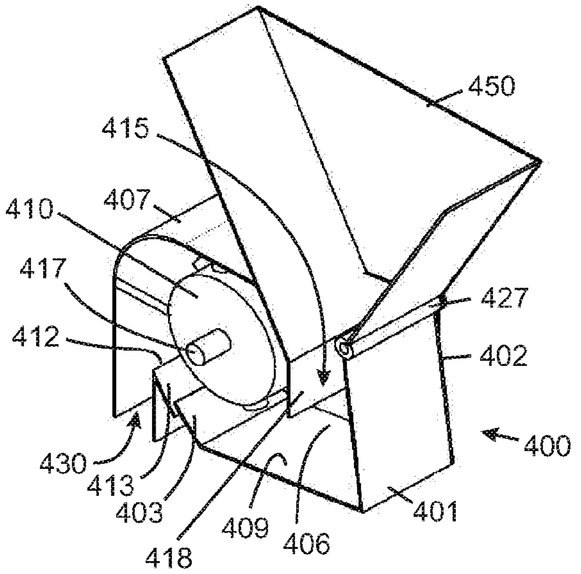
FIG. 4A depicts a perspective view of a fourth embodiment of a metering apparatus where flow of agricultural product to an air distribution line is prevented by lowering the agricultural product in a metering chamber away from a continuously turning meter roller to disengage the agricultural product from the meter roller.
Figure 4B:
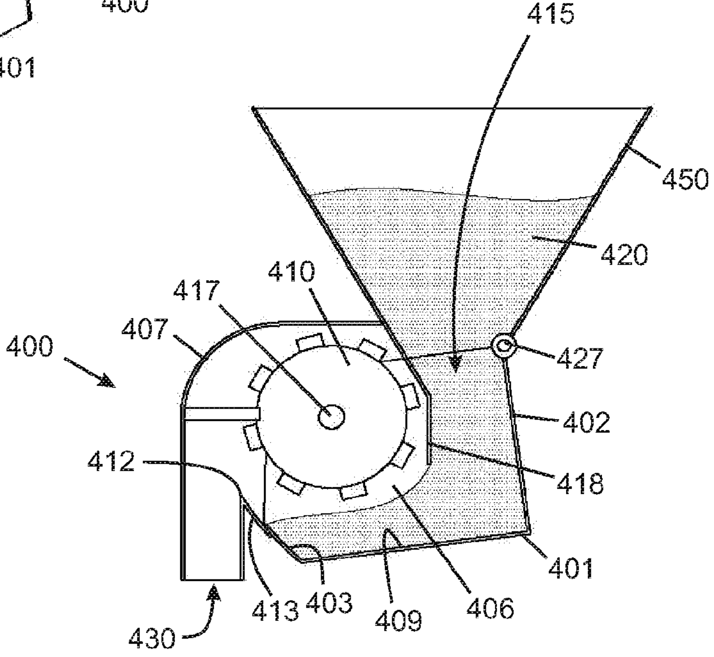
FIG. 4B depicts a side view of FIG. 4A.
Figure 4C:
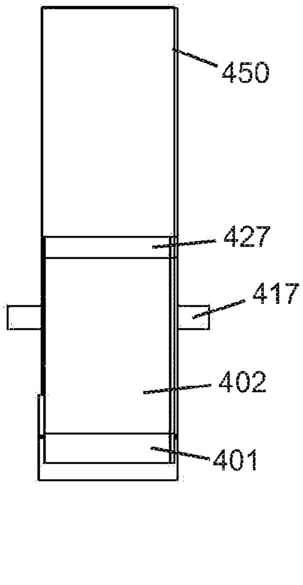
FIG. 4C depicts an end view of FIG. 4A.
Figure 4D:
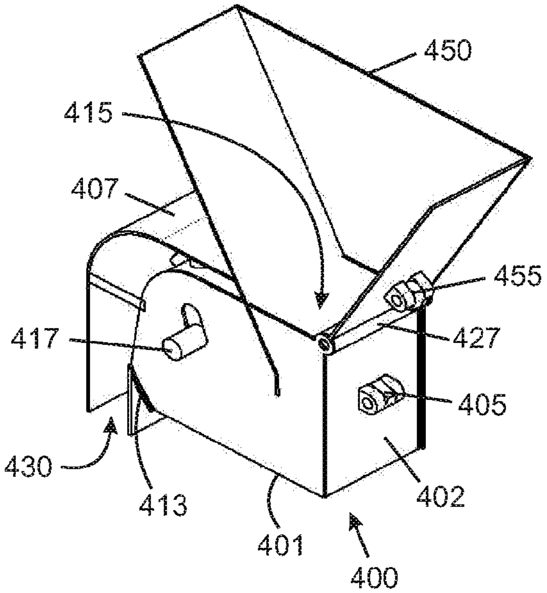
FIG. 4D depicts the metering apparatus of FIG. 4A where the agricultural product is raised in the metering chamber to engage the meter roller to permit metering of the agricultural product to the air distribution line.
Figure 4E:
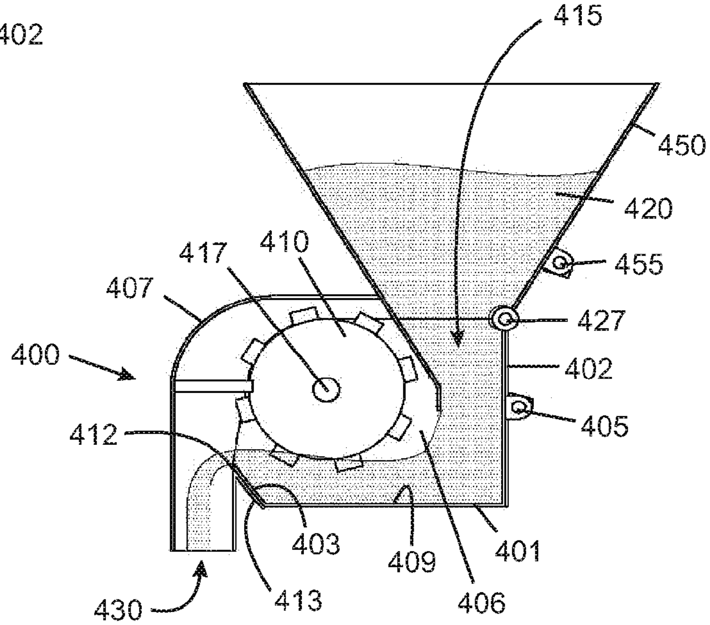
FIG. 4E depicts a side view of FIG. 4D.

With reference to FIG. 4A, FIG. 4B, FIG. 4C, FIG. 4D, FIG. 4E and FIG. 4F, a metering apparatus 400 is shown in which flow of agricultural product 420 from a hopper 450 to an air distribution line (not shown) may be stopped from entering the air distribution line by lowering the agricultural product 420 in a metering chamber 406 away from a continuously turning meter roller 410 to disengage the agricultural product 420 from the meter roller 410. The metering apparatus 400 comprises the meter roller 410, in this case a pegged meter roller although any suitable meter roller (e.g. a smooth roller, fluted roller or high output roller) may be employed, mounted on shaft 417 and disposed within the metering chamber 406 of a meterbox 407. The metering chamber 406 is in communication with the hopper 450 via the inlet 415 so that the agricultural product 420 in the hopper 450 can flow into the metering chamber 406. The agricultural product 420 collects on a floor 409 of the metering chamber 406 and engages with the meter roller 410. As seen in FIG. 4D and FIG. 4E, when the floor 409 of the metering chamber 406 is in a raised position, rotation of the meter roller 410, in this case clockwise rotation, meters the agricultural product 420 at a regulated rate up and over a lip 412 proximate an end of an inclined portion 413 of the meterbox 407 to exit the metering chamber 406 through an outlet 430 into the air distribution line, which carries the agricultural product 420 to product application outlets for distribution in a field.

Figure 4F:
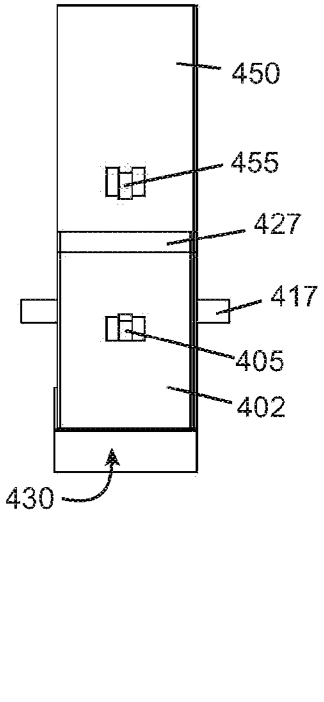
FIG. 4F depicts an end view of FIG. 4D.

When it becomes desirable to cut off flow of the agricultural product 420 to the air distribution line, the floor 409 of the metering chamber 406 is lowered proximate the lip 412 as seen in FIG. 4A and FIG. 4B. The metering chamber 406 comprises a trough portion 401, the trough portion 401 comprising side walls, the floor 409 and a back wall 402 hingedly secured to the hopper 450 (or an immovable part of the meterbox 407) by a hinge 427 proximate the inlet 415. Allowing the trough portion 401 to swing counter-clockwise around the hinge 427 (in the configuration depicted in FIG. 4D and FIG. 4E) causes the floor 409 to become lower proximate the lip 412 as seen in FIG. 4A and FIG. 4B. Because the floor 409 proximate the lip 412 is now lower, the meter roller 410 cannot engage the agricultural product 420 resting on the floor 409 thereby stopping flow of agricultural product 420 over the lip 412 and stopping flow of agricultural product 420 into the outlet 430. To prevent agricultural product 420 from slipping between the inclined portion 413 of the meterbox 407 and the floor 409 when the floor 409 is in the lowered position, the floor 409 comprises a matching inclined portion 403 that slides along the inclined portion 413 maintaining a seal between the metering chamber 406 and the exterior of the meterbox. Further, to ensure that the metering chamber 406 doesn't simply fill up with agricultural product 420 to the level of the meter roller 410 when the floor 409 is in the lowered position, an inlet guard plate 418 depending down from the hopper 450 into the metering chamber 406 is configured to be long enough that the end of the inlet guard plate 418 is at the level of or lower than the lip 412. To bring the agricultural product 420 back into contact with the meter roller 410, the trough portion 401 is swung in the reverse direction to raise the floor 409 back to the height depicted in FIG. 4D and FIG. 4E. The trough portion 401 may be raised and lowered by an actuator, for example a linear actuator or a hydraulic cylinder, connecting the trough portion 401 to the hopper 450. As shown in FIG. 4D, FIG. 4E and FIG. 4F, the actuator may be secured to the outside of the hopper 450 at attachment 455 and to the outside of the back wall 402 of the trough portion 401 at attachment 405.

Figure 5A:
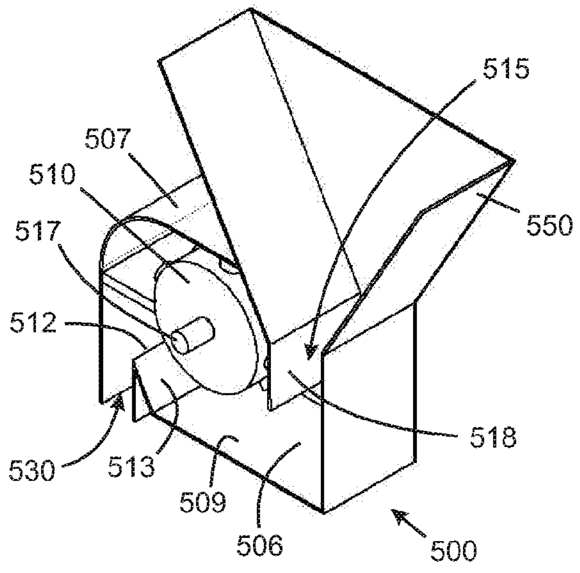
FIG. 5A depicts a perspective view of a fifth embodiment of a metering apparatus where flow of agricultural product to an air distribution line is prevented by raising a continuously rotating meter roller away from the agricultural product in a metering chamber to disengage the meter roller from the agricultural product.
Figure 5B:
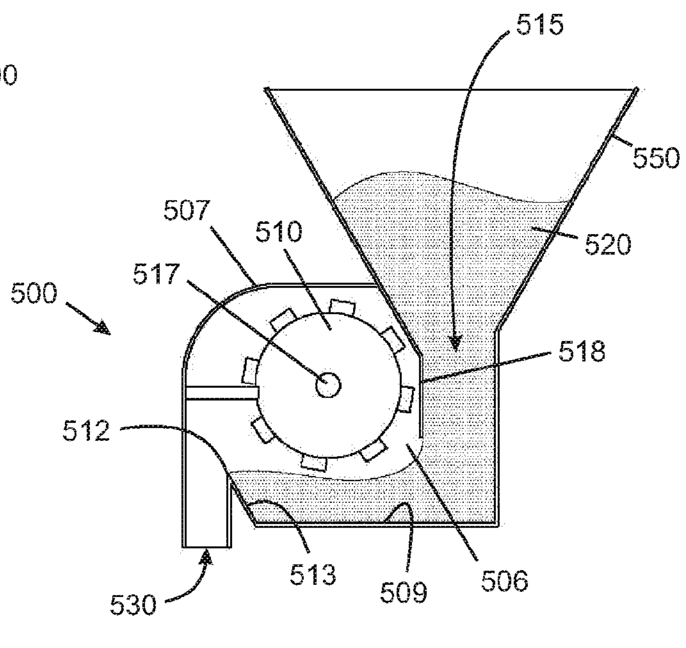
FIG. 5B depicts a side view of FIG. 5A.
Figure 5C:
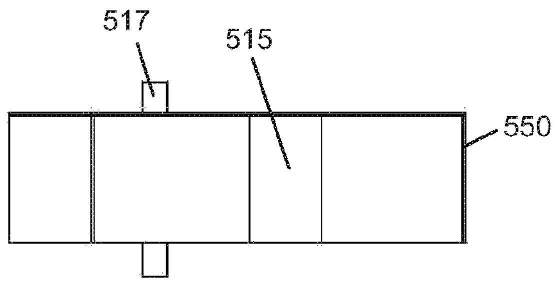
FIG. 5C depicts a top view of FIG. 5A.
Figure 5D:
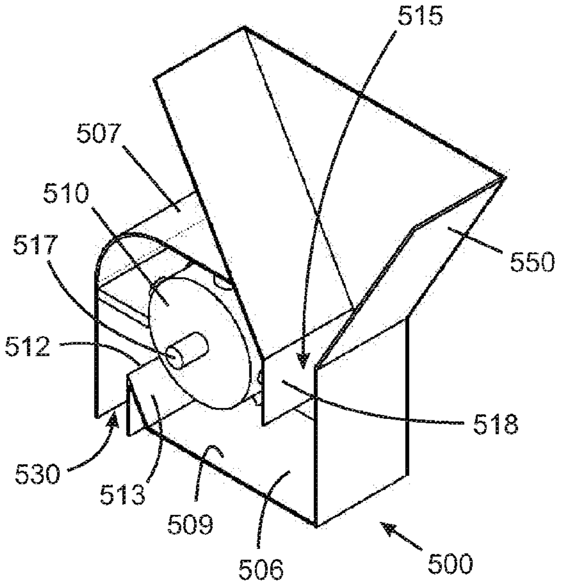
FIG. 5D depicts the metering apparatus of FIG. 5A where the meter roller is lowered in the metering chamber to engage the meter roller with the agricultural product to permit metering of the agricultural product to the air distribution line.
Figure 5E:
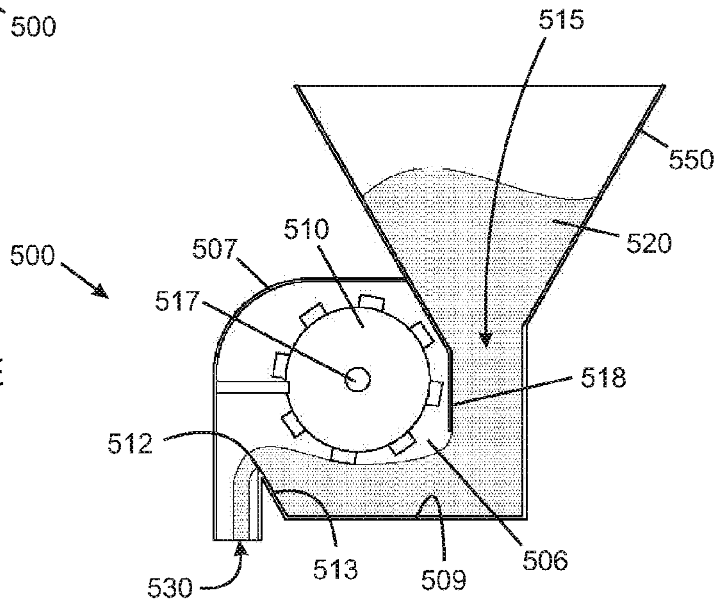
FIG. 5E depicts a side view of FIG. 5D.
Figure 5F:
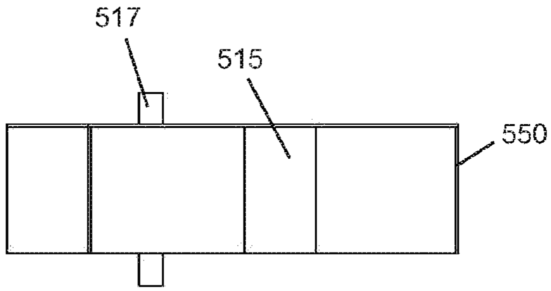
FIG. 5F depicts a top view of FIG. 5D.

With reference to FIG. 5A, FIG. 5B, FIG. 5C, FIG. 5D, FIG. 5E and FIG. 5F, a metering apparatus 500 is shown in which flow of agricultural product 520 from a hopper 550 to an air distribution line (not shown) may be stopped from entering the air distribution line by raising a meter roller 510 away from the agricultural product 520 in a metering chamber 506 to disengage the agricultural product 520 from the meter roller 510. The metering apparatus 500 comprises the meter roller 510, in this case a pegged meter roller although any suitable meter roller (e.g. a smooth roller, fluted roller or high output roller) may be employed, mounted on shaft 517 and disposed within the metering chamber 506 of a meterbox 507. The metering chamber 506 is in communication with the hopper 550 via the inlet 515 so that the agricultural product 520 in the hopper 550 can flow into the metering chamber 506. The agricultural product 520 collects on a floor 509 of the metering chamber 506 and engages with the meter roller 510. As seen in FIG. 5E, when the meter roller 510 is in a lowered position, rotation of the meter roller 510, in this case clockwise rotation, meters the agricultural product 520 at a regulated rate up and over a lip 512 proximate an end of an inclined portion 513 of the floor 509 of the meterbox 507 to exit the metering chamber 506 through an outlet 530 into the air distribution line, which carries the agricultural product 520 to product application outlets for distribution in a field.

When it becomes desirable to cut off flow of the agricultural product 520 to the air distribution line, the meter roller 510 is raised as seen in FIG. 5A and FIG. 5B. The meter roller 510 may be raised by lifting the shaft 517. Because the meter roller 510 is now higher, the meter roller 510 cannot engage the agricultural product 520 resting on the floor 509 thereby stopping flow of agricultural product 520 over the lip 512 and stopping flow of agricultural product 520 into the outlet 530. Further, to ensure that the metering chamber 506 doesn't simply fill up with agricultural product 520 to the level of the meter roller 510 when the meter roller 510 is in the raised position, an inlet guard plate 518 depending down from the hopper 550 into the metering chamber 506 is configured to be long enough that the end of the inlet guard plate 518 is at the level of or lower than the lip 512. To bring the agricultural product 520 back into contact with the meter roller 510, the meter roller 510 is lowered back into contact with the agricultural product 520 as depicted in FIG. 5E.

Figure 6A:
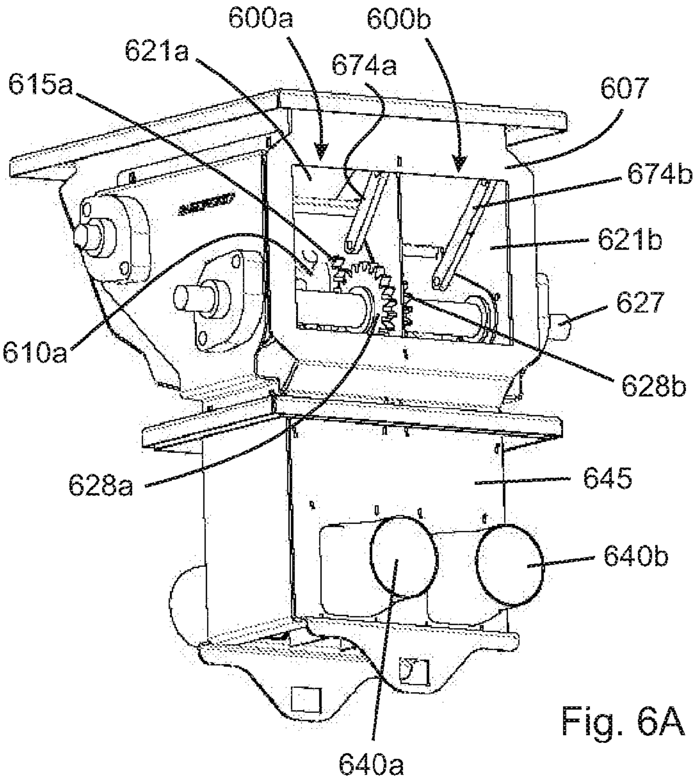
FIG. 6A depicts a perspective view of a sixth embodiment of a metering apparatus where flow of agricultural product to an air distribution line is prevented by pivoting a continuously rotating meter roller to raise the meter roller away from the agricultural product in a metering chamber to disengage the meter roller from the agricultural product.
Figure 6B:
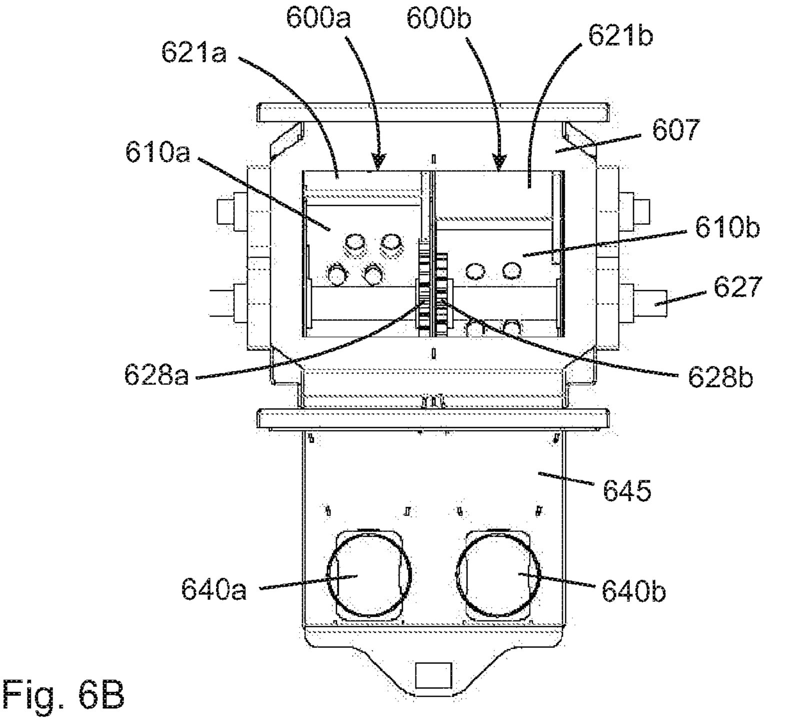
FIG. 6B depicts an end view of the metering apparatus of FIG. 6A.

With reference to FIG. 6A and FIG. 6B, two side-by-side metering apparatuses 600*a*, 600*b* are depicted each operating similarly to the metering apparatus depicted in FIG. 5A to FIG. 5F. Both metering apparatuses 600*a*, 600*b* are housed in the same meterbox 607. The metering apparatus 600*a* comprises a roller housing that is shown housing meter roller 610*a* in a raised, product disengaging position, while the metering apparatus 600*b* comprises a roller housing that is shown housing meter roller 610*b* in a lowered product engaging position. The housing that houses meter roller 610*a* is raised and lowered by actuator 674*a*, while the housing that houses meter roller 610*b* is raised and lowered by actuator 674*b*. The actuators 674*a* and 674*b* may be independently controlled so that one or the other or both meter rollers 610*a*, 610*b* may be metering or not metering agricultural product.

The meter rollers 610*a*, 610*b* are constantly driven by the same drive axle 627, whether in the raised or lowered positions. The meter rollers 610*a*, 610*b* are mounted on separate shafts (not shown) together with separate gears. Gear 615*a* for meter roller 610*a* can be seen in FIG. 6A. The gears are intermeshed with sprockets 628*a*, 628*b* mounted on and driven by the drive axle 627. The drive axle 627 drives the sprockets 628*a*, 628*b*, which in turn drive the gears and thus the meter rollers 610*a*, 610*b*. The drive axle 627 also provides an axis for the meter rollers 610*a*, 610*b* to pivot about when being raised and lowered by the actuators 674*a* and 674*b*. Raising and lowering the meter rollers 610*a*, 610*b* does not disengage the gears from the sprockets so the meter rollers 610*a*, 610*b* are always driven, whether or not they are actively metering agricultural product. Because the meter rollers 610*a*, 610*b* are mounted on separate shafts, servicing the meter rollers 610*a*, 610*b*, for example, cleaning or changing out the meter rollers, is facilitated as the meter rollers 610*a*, 610*b* may be accessed, and if needed individually removed, through access ports 621*a*, 621*b*. The structure and operation of the remainder of the metering apparatuses 600*a*, 600*b* are like that described in connection with FIG. 5A to FIG. 5F.

The metering apparatuses 600*a*, 600*b* are shown in cooperation with air distribution lines 640*a*, 640*b* therebelow. The air distribution lines 640*a*, 640*b* are housed in an air distribution box 645 and each line 640*a*, 640*b* receives agricultural product metered by the metering apparatus directly thereabove. Agricultural product metered into each line 640*a*, 640*b* is carried by a flow of air to product application outlets for distribution in a field.

Figure 7A:
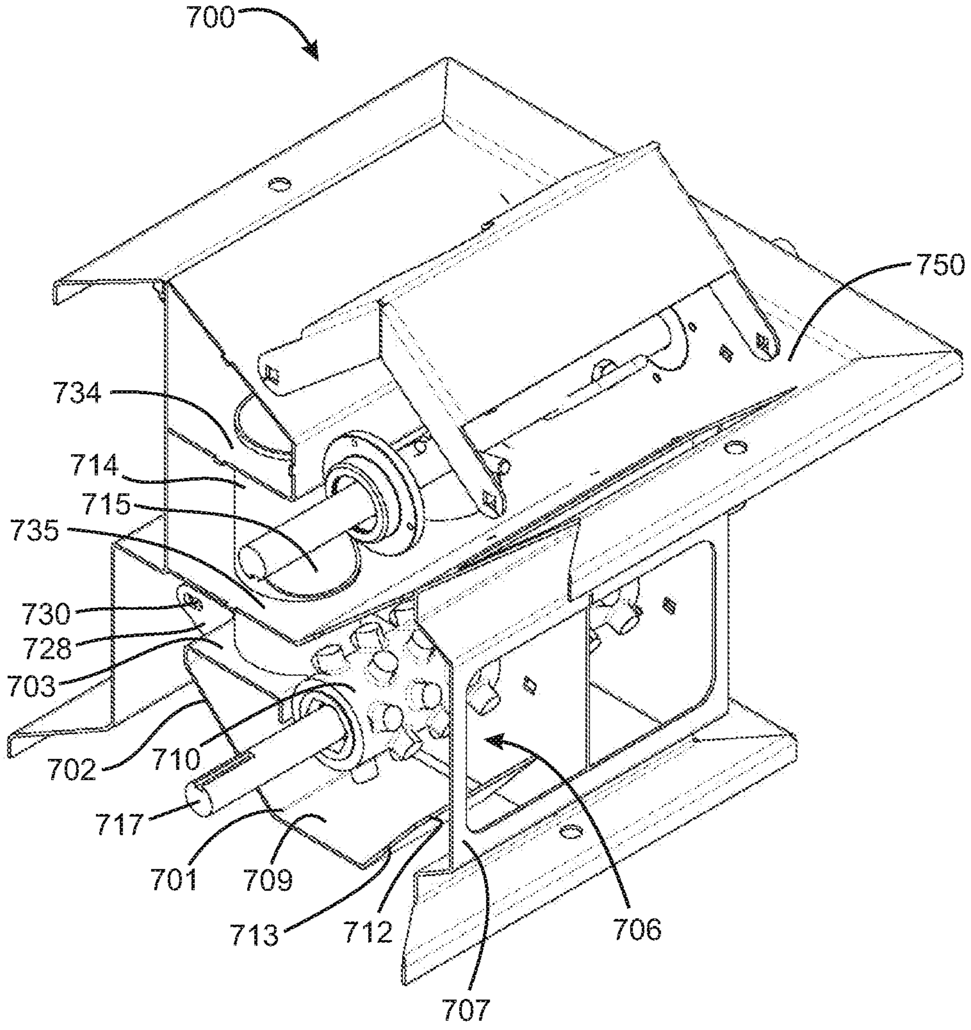
FIG. 7A depicts a perspective view of a seventh embodiment of a metering apparatus where flow of agricultural product to an air distribution line is prevented by moving the agricultural product in a metering chamber away from a meter roller to disengage the agricultural product from the meter roller.
Figure 7C:
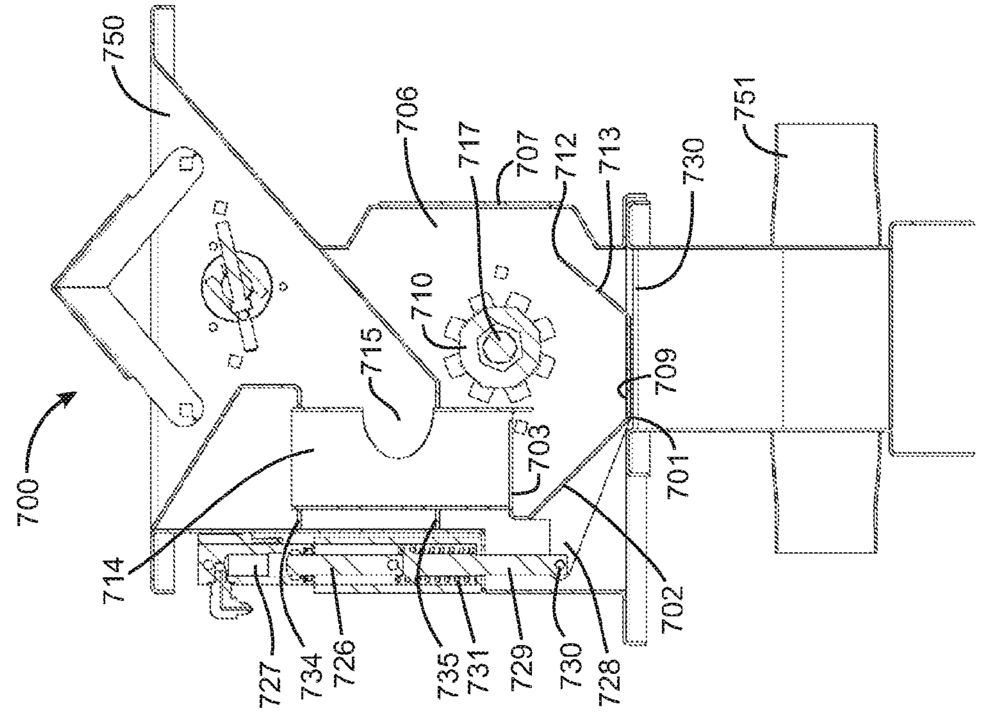
FIG. 7C depicts a side view of FIG. 7A in a configuration for preventing product flow to the air distribution line.
Figure 7B:
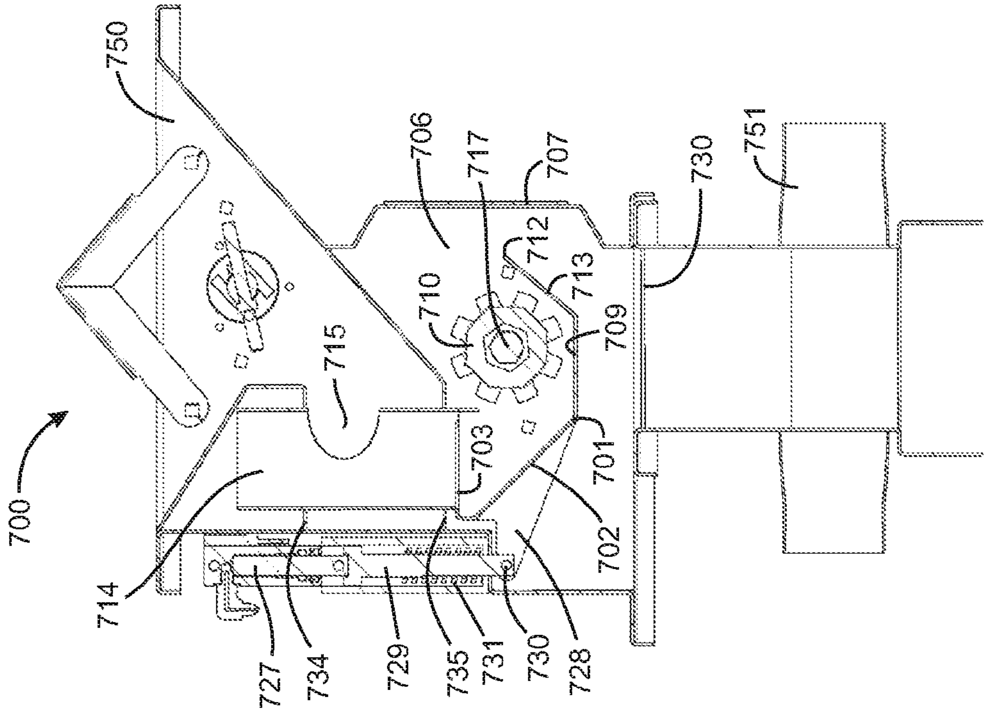
FIG. 7B depicts a side view of FIG. 7A in a configuration for permitting product flow to the air distribution line.

With reference to FIG. 7A, FIG. 7B and FIG. 7C, a metering apparatus 700 is shown in which flow of agricultural product from a hopper 750 to an air distribution line 751 may be stopped from entering the air distribution line 751 by moving, in this case lowering, the agricultural product in a metering chamber 706 away from a continuously turning meter roller 710 to disengage the agricultural product from the meter roller 710. The metering apparatus 700 comprises the meter roller 710, in this case a pegged meter roller although any suitable meter roller (e.g. a smooth roller, fluted roller or high output roller) may be employed, mounted on shaft 717 and disposed within the metering chamber 706 of a meterbox 707. The metering chamber 706 is in communication with the hopper 750 via a tube 714 having an inlet 715 so that the agricultural product in the hopper 750 can flow through the tube 714 into the metering chamber 706. The agricultural product collects on a floor 709 of the metering chamber 706 and engages with the meter roller 710. As seen in FIG. 7B, when the floor 709 of the metering chamber 706 is in a raised position, rotation of the meter roller 710, in this case counterclockwise rotation, meters the agricultural product at a regulated rate up and over a lip 712 proximate an end of an inclined portion 713 extending up from the floor 709 to exit the metering chamber 706 through an outlet 730 into the air distribution line 751, which carries the agricultural product to product application outlets for distribution in a field.

When it becomes desirable to cut off flow of the agricultural product to the air distribution line 751, the floor 709 of the metering chamber 706 is lowered as seen in FIG. 7A and FIG. 7C. The meterbox 707 comprises a trough portion 701, the trough portion 701 comprising the floor 709, a back wall 702 and a ceiling portion 703, the ceiling portion 703 secured to the tube 714 so that agricultural product may flow from the tube 714 into the metering chamber 706 through an aperture in the ceiling portion 703. To lower the floor 709, the trough portion 701 and the tube 714 to which the ceiling portion 703 of the trough portion 701 is secured, are linked to an actuator 727 (e.g. a hydraulic cylinder or an electric actuator) through a flange 728 secured to the back wall 702 of the trough portion 701. The flange 728 is linked to a plunger 729 by a linkage pin 730, and the plunger 729 is connected to an extendible rod 726 of the actuator 727. Extension of the rod 726 pushes the trough portion 701 and the tube 714 vertically downward to the lowered product disengaging position as seen in FIG. 7A and FIG. 7C, while retraction of the rod 726 pulls the trough portion 701 and the tube 714 vertically upward to the raised product engaging position as seen in FIG. 7B. A compression spring 731 seated around the plunger 729 is compressed when the rod 726 is extended thereby exerting a bias on the trough portion 701 and the tube 714 back toward the raised position. In case of a failure of the actuator 727, the spring 731 ensures that the trough portion 701 and the tube 714 are in the raised position so that metering of agricultural product into the air distribution line 751 may continue. While the tube 714 is depicted as cylindrical, any suitable cross-sectional shape of tube may be employed, for example an elliptical or a polyhedral cross-section (e.g. triangular, square, rectangular, pentagonal, hexagonal and the like). A polyhedral cross-section provides a benefit of reducing a tendency of the tube to twist or move laterally while being raised and lowered. To further reduce the tendency of the tube 714 to move laterally while being raised and lowered, the tube 714 is bracketed by guides 734 and 735, the tube 714 being allowed to move vertically freely within the guides 734 and 735.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

The invention claimed is:

1. A metering apparatus for distributing an agricultural product, comprising:

- a meterbox configured for association with a hopper for receiving agricultural product from the hopper;
- a rotatable metering element disposed within a chamber in the meterbox, the rotating metering element configured to deliver the agricultural product at a regulated rate from the hopper through the chamber to a product distribution line; and,
- stopping means for selectively stopping delivery of the agricultural product to the product distribution line, the stopping means comprising a disengagement structure for disengaging the agricultural product from the metering element while the metering element continues to rotate, wherein the chamber comprises a chamber floor and the disengagement structure comprises the chamber floor moveable between a raised product engaging position and a lowered product disengaging position.

2. The metering apparatus according to claim 1 comprising a plurality of the rotatable metering elements.

3. The metering apparatus according to claim 2, wherein the metering elements are driven on a common shaft.

4. The metering apparatus according to claim 2, wherein the metering elements are disposed individually within individual chambers in the meterbox.

5. The metering apparatus according to claim 1, wherein the chamber comprises one or more openable and closeable access ports for permitting access into the chamber without removing the metering element.

6. The metering apparatus according to claim 1, wherein disengaging the agricultural product from the metering element comprises moving the agricultural product away from the metering element.

7. The metering apparatus according to claim 1, wherein the chamber comprises a trough portion secured by a hinge to the hopper or an immovable part of the meterbox, whereby the trough portion comprises the chamber floor and the trough portion may swing on the hinge between the raised product engaging position and the lowered product disengaging position.

8. The metering apparatus according to claim 1, wherein the meterbox comprises an inclined portion having a lip over which the agricultural product flows to reach an outlet to the product distribution line, and an inlet guard depending down from the hopper into the chamber such that an end of the inlet guard is at a level low enough to prevent continuous agricultural product flow over the lip.

9. The metering apparatus according to claim 8, wherein the chamber floor comprises an inclined portion that slidably abuts the inclined portion of the meterbox to form a seal to prevent agricultural product from exiting the chamber without flowing over the lip.

10. A metering apparatus for distributing an agricultural product, comprising:

a meterbox configured for association with a hopper for receiving agricultural product from the hopper;

a rotatable metering element disposed within a chamber in the meterbox, the rotating metering element configured to deliver the agricultural product at a regulated rate from the hopper through the chamber to a product distribution line; and, stopping means for selectively stopping delivery of the agricultural product to the product distribution line, the stopping means comprising a disengagement structure for disengaging the agricultural product from the metering element while the metering element continues to rotate, wherein the chamber comprises a trough portion secured to a translatable product conduit, the product conduit configured to permit agricultural product to flow from the hopper to the trough portion, the product conduit and trough portion translatable between a product engaging position and a product disengaging position.

11. The metering apparatus according to claim 10, wherein the product conduit and trough portion are vertically translatable by an actuator.

12. The metering apparatus according to claim 11, wherein the actuator comprises a hydraulic cylinder.

13. The metering apparatus according to claim 10, wherein a compression spring biases the product conduit and trough portion toward the product engaging position.

14. An agricultural product distribution system comprising a metering apparatus as defined in claim 1.

15. An agricultural product distribution system comprising a metering apparatus as defined in claim 10.

* * * * *

UNITED STATES PATENT AND TRADEMARK OFFICE

CERTIFICATE OF CORRECTION

PATENT NO. : 9,635,803 B2
APPLICATION NO. : 14/668445
DATED : May 2, 2017
INVENTOR(S) : Gray et al.

It is certified that error appears in the above-identified patent and that said Letters Patent is hereby corrected as shown below:

On the Title Page

Item (72) Inventors should read:
(72) Inventors: Geof J. Gray, Burford (CA); Mikhail Rodionov, North York (CA); John Mark Averink, Norwich (CA); Johan Braun Friesen, Tillsonburg (CA); Jesse Abram Dyck, London (CA)

Signed and Sealed this
Fourteenth Day of August, 2018

Andrei Iancu
*Director of the United States Patent and Trademark Office*